United States Patent [19]

Mitchell et al.

[11] Patent Number: 4,499,135
[45] Date of Patent: Feb. 12, 1985

[54] GASKETS

[75] Inventors: Barclay Mitchell, Amersham; Kenneth Moore, Maidenhead, both of England

[73] Assignee: Payez International Limited, Berkshire, England

[21] Appl. No.: 446,871

[22] Filed: Dec. 6, 1982

[30] Foreign Application Priority Data

Dec. 9, 1981 [GB] United Kingdom ............... 81370114

[51] Int. Cl.$^3$ ............................................... B32B 3/10
[52] U.S. Cl. ..................................... 428/137; 428/443; 428/444; 428/445; 428/447; 428/449; 428/496; 428/535; 277/228; 277/235 B
[58] Field of Search ............................ 277/228, 235 B; 428/137, 443, 445, 496, 449, 447, 444, 535

[56] References Cited

U.S. PATENT DOCUMENTS 3,770,480 11/1973 Farnam .............................. 428/443
4,049,856 9/1977 Adams ............................... 428/132
4,349,610 9/1982 Parker ................................ 428/447

*Primary Examiner*—George F. Lesmes
*Assistant Examiner*—Pamela R. Schwartz
*Attorney, Agent, or Firm*—Cushman, Darby & Cushman

[57] ABSTRACT

A paper-based gasket is impregnated with a silicone resin to improve resistance to water/antifreeze mixtures. The gasket is made from paper essentially free from amine-containing material such as wetting agent and is bonded with a sulphur-free or sulphur donor free rubber binder.

6 Claims, No Drawings

GASKETS

This invention relates to gaskets and in particular to cylinder head gaskets for modern, high performance engines. Such gaskets have proved to be very vulnerable to water and/or to water-antifreeze mixtures.

Water penetration into the body of the gasket, which is usually a gasket paper including a rubber binder, has the effect of causing stress relaxation. It is thought to possibly lubricate the progressive collapse and/or flow of the body material, thereby accelerating breakdown of the seal between passageways through the gasket.

Present, or indeed old fashioned remedies for this are too labour-intensive and/or involve too many processing steps to be commercially attractive under modern mass production conditions.

According to the present invention a gasket is impregnated with a curable silicone resin after manufacture from paper essentially free from amine-containing material, such as wetting agent and which is bonded with a sulphur-free, or sulphur-donor free rubber binder. Preferably impregnation takes place after insertion of cylinder bore eyelets and any other eyelets.

The silicone resin is cured in situ in the gasket. Nitrile rubber is the preferred binder because of its toughness even when uncured. It also has excellent heat/oil resistance. It has been found (by thermal analysis techniques) that when the paper is asbestos there is an apparent tendency for cross-linking of the rubber to occur on heating, even in the absence of all conventional sulphur donor curing agents.

The use of no wetting agents and no sulphur or sulphur donor in the gasket paper has been found to enable the use of readily available silicone impregnants. In particular, poly-addition silicones such as polymethyl-vinyl silicones containing less than 5% weight of solvent and which are heat curable in the presence of a platinum complex catalyst can be used. Such compounds are available from several commercial sources. Previously such silicones were not readily useable because the catalyst was destroyed or at least inhibited by traces of sulphur, organic metal salts of zinc and/or tin and amines (from the wetting agents).

Furthermore, very satisfactory penetration by the silicone resin impregnant is readily achieved and the resultant sealing performance after curing is excellent. Instead of sealing against maximum water pressures of say 2 bar, sealing against pressures of from 6 to 10 bar can be achieved. Impregnation after all eyeletting operations (if any) is preferred because it prevents any substantial impregnation under the eyelet. The high pressures and temperatures to which metal cylinder bore eyelets are subjected are likely to cause excessive stress relaxation if the underlying paper is impregnated beforehand.

The utility of gaskets according to this invention is not limited to automotive applications, since similar operaing conditions and problems occur elsewhere, in for example the chemical process industry.

The invention illustrated by the following example. An asbestos-based gasket paper was made by a conventional paper making process, except for the use of a furnish from which amine-containing materials such as wetting agents were omitted together with sulphur-containing (or sulphur donating) vulcanising agents for the rubber binder.

Samples of the paper were blanked into cylinder head gasket form and made up into gaskets, with the paper as a facing. Metal eyelets were pressed into major (cylinder bore) and minor (water/oil passages) apertures, in the usual way.

Some of the resultant gaskets were thereafter impregnated with a standard curable polymethyl-vinyl silicone resin obtained from commercial supplier; it was formulated to contain about 2% by weight of a platinum complex catalyst in solution in isopropanol. The viscosity was 300 cps and the pot life of the resin was about 16 hours, adequate for production purposes. Impregnation was carried out by immersing the gaskets for a least five minutes.

The resin was then cured for 10 minutes at 60° C., followed by at least 10 minutes at 150° C., the use of two stages being found helpful in avoiding an excessively rapid temperature rise.

The performance of the treated gaskets made from the special paper was very satisfactory as regards their behaviour in a car engine. Not only was the silicone resin properly cured in situ but the product was much more resistant to water/antifreeze penetration than untreated gaskets were.

We claim:

1. A gasket impregnated with a cured silicone resin manufactured from paper which is essentially free from amine containing material and which is bonded with a sulphur-free or sulphur donor free rubber binder.

2. The gasket of claim 1 wherein impregnation is carried out after insertion of cylinder bore eyelets and any other eyelets.

3. The gasket of claim 1 wherein the rubber is nitrile rubber.

4. The gasket of claim 1 wherein the silicone resin is cured in situ after impregnation.

5. The gasket of claim 1 wherein the silicone resin is a heat curable poly addition silicone containing a platinum catalyst.

6. The gasket of claim 1 wherein the silicone resin has a solvent content of less than 5% by weight.

* * * * *

UNITED STATES PATENT AND TRADEMARK OFFICE
CERTIFICATE OF CORRECTION

PATENT NO. : 4,499,135
DATED : February 12, 1985
INVENTOR(S) : MITCHELL et al

It is certified that error appears in the above-identified patent and that said Letters Patent is hereby corrected as shown below:

On the title page, line "/73/ Assignee:", delete "Payez" and insert --Payen--.

Signed and Sealed this

Tenth Day of September 1985

[SEAL]

Attest:

DONALD J. QUIGG

Attesting Officer     Acting Commissioner of Patents and Trademarks - Designate